United States Patent
Jin et al.

(10) Patent No.: US 11,193,818 B2
(45) Date of Patent: Dec. 7, 2021

(54) FREQUENCY MODULATION DEMODULATOR BASED ON FIBER GRATING SENSOR ARRAY

(71) Applicant: Zhejiang University, Hangzhou (CN)

(72) Inventors: Xiaofeng Jin, Hangzhou (CN); Zhiwei Cheng, Hangzhou (CN); Jianhai Ou, Hangzhou (CN); Xiangdong Jin, Hangzhou (CN); Yijie Du, Hangzhou (CN); Yinfang Xie, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 16/945,838

(22) Filed: Aug. 1, 2020

(65) Prior Publication Data
US 2021/0033452 A1    Feb. 4, 2021

(51) Int. Cl.
*G01H 9/00* (2006.01)
*G01D 5/353* (2006.01)
*G02B 6/293* (2006.01)

(52) U.S. Cl.
CPC ......... *G01H 9/004* (2013.01); *G01D 5/35383* (2013.01); *G02B 6/29352* (2013.01)

(58) Field of Classification Search
CPC .............. G01H 9/004; G01D 5/35383; G01D 5/35393; G01D 5/35316; G02B 6/29352; H04B 10/54; H04B 10/503; H04B 10/508; H04B 10/516
See application file for complete search history.

(56) References Cited

U.S. PATENT DOCUMENTS 6,466,706 B1 * 10/2002 Go ..................... G01D 5/35303
                                                                385/12

* cited by examiner

*Primary Examiner* — John Bedtelyon

(57) ABSTRACT

A frequency modulation demodulator based on fiber grating sensor array comprises: a laser, radio frequency signal source, acousto-optic modulator, delay fiber pair, Mach-Zehnder modulator, optical filter, optical amplifier, optical isolator, circulator, fiber grating sensor array, photodetector and data acquisition card. By the cooperation of delay fiber pair and the fiber grating, the reflected optical pulses of the two gratings (the front grating and the back grating) are overlapped in the time domain to form interference, and thereby achieving multi-point array interference demodulation.

8 Claims, 2 Drawing Sheets

FREQUENCY MODULATION DEMODULATOR BASED ON FIBER GRATING SENSOR ARRAY

CROSS-REFERENCE TO RELATED APPLICATIONS

This application claims priority to Chinese Application No. 201910708418.0, filed on Aug. 1, 2019, entitled "FREQUENCY MODULATION DEMODULATOR BASED ON FIBER GRATING SENSOR ARRAY", which is hereby incorporated by reference.

TECHNICAL FIELD

The present disclosure relates to the technical field of optical fiber communication, and particularly to a frequency modulation demodulator based on fiber grating sensor array.

BACKGROUND

Acoustic waves are the only form of energy that can propagate over long distances in the ocean, and hydrophones are the basic device for detecting acoustic signals in the ocean. Fiber-optic sensors which are used as hydrophones have characteristics including high sensitivity, strong resistance to electromagnetic interference, and resistance to underwater harshness environment. With the development of marine science, large-scale and miniaturization have become an important direction for the fiber-optic hydrophone arrays. However, with the deepening of applications, the traditional fiber-optic hydrophone arrays have revealed their limits, which are mainly reflected in the complex structure, small detectable dynamic range, and the complicated demodulation algorithm. Accordingly, it has become a major issue to be addressed for the development of large-scale miniaturized fiber-optic hydrophone arrays to seek a simple, easy and reliable system structure for the large-scale miniaturized fiber-optic hydrophone arrays.

General demodulation methods for fiber-optic hydrophones include 3×3 coupler method, PGC (Phase Generation Carrier Technology) method, and heterodyne method. Among them, the PGC demodulation method has a simple system structure, but correspondingly, frequency chirp and additional light source modulation will be introduced, and thereby increasing the relative intensity noise. In order to solve the problems caused by light source modulation, Chinese patent application Pub. No. CN109450531A proposes a fiber interferometer sensor disturbance signal demodulator based on single side-band frequency modulation, which realizes the phase modulation by single side-band filtering of intensity modulation signal, thus reducing the relative intensity noise of the demodulation system.

However, the above method is only designed for a single hydrophone sensor. In practical applications, the fiber-optic sensor is usually arranged in the form of a sensor array for multiplexing. Therefore, it is necessary to redesign a fiber-optic sensor sensing array and demodulation system thereof realized by a single side-band frequency modulation method.

Microwave field through optical-borne radio frequency signals can be applied to the fiber-optic sensors, which combine the advantages of light waves and microwave signals. Low-frequency microwave signals cannot distinguish the polarization dispersion of light, which makes them insensitive to optical waveguide materials. It can be implemented on different waveguides such as single-mode fiber, multi-mode fiber and sapphire fiber. The phase information of microwave signals can be accurately extracted, so it can be applied to the measurement of distributed sensors, with high signal-to-noise ratio and polarization insensitive.

SUMMARY

In view of the above, the present disclosure provides a frequency modulation (FM) demodulator based on fiber grating sensor array. By the cooperation of delay fiber pair and the fiber gratings, the reflected optical pulses of the two gratings (the front grating and the back grating) are overlapped in the time domain to form interference, and thereby achieving multi-point array interference demodulation.

A frequency modulation demodulator based on fiber grating sensor array comprises: a laser, a radio frequency signal source, an acousto-optic modulator, a delay fiber pair, a Mach-Zehnder modulator (MZM), an optical filter, an optical amplifier, an optical isolator, a circulator, a fiber grating sensor array, a photodetector and a data acquisition card.

The laser is configured for emitting continuous narrow linewidth optical signals.

The radio frequency signal source is configured for generating a frequency shift signal, an intensity modulation signal with a frequency $f_1$, and a clock synchronization signal.

The acousto-optic modulator is configured for simultaneously performing frequency shift and intensity modulation on the optical signal emitted by the laser according to the frequency shift signal, thereby outputting a pulsed optical signal.

The delay fiber pair is configured for dividing the pulsed optical signal output by the acousto-optic modulator into two paths, and the two paths of optical signals are combined into an optical pulse pair signal after different delays.

The Mach-Zehnder modulator is configured for modulating intensity of the optical pulse pair signal generated by the delay fiber pair and outputting the modulated optical pulse pair signal according to the intensity modulation signal.

The optical filter is configured for filtering the optical pulse pair signal output by the Mach-Zehnder modulator and outputting the filtered optical pulse pair signal, so as to filter out the optical side-bands on one side of the optical filter. The optical pulse pair signal output by the optical filter enters the fiber grating sensor array after passing through the optical amplifier, the optical isolator, the circulator.

The fiber grating sensor array is configured for detecting external sensing signals (i.e. temperature, pressure, vibration, etc.) at different positions. These external sensing signals will cause the phase change of the input optical pulse pair, and feedback a series of interference optical pulse signal having external sensing information. These external sensing signals then are outputted by the circulator to the photodetector.

The photodetector is configured to convert the interference optical pulse signal into the electrical signals.

The data acquisition card is configured for synchronously sampling the electrical signals based on the clock synchronization signal to obtain the corresponding digital signals, and then demodulating the digital signals by the internal digital signal processing unit to obtain the external sensing signals.

In some embodiments, a narrow linewidth DFB (Distributed Feedback Laser) light source is used as the laser. The radio frequency signal source has an analog signal source and internally integrates a frequency modulation module and a synchronization module.

In some embodiments, the laser, the laser, the acousto-optic modulator, and the delay fiber pair are polarization-maintaining devices.

In some embodiments, the delay fiber pair comprises a first coupler, a second coupler, a first fiber and a second fiber, wherein the first coupler is configured for dividing the pulsed optic signal output by the acousto-optic modulator into two pulsed optic signals. The two paths of the two optical signals individually passes through the first fiber and the second fiber, and are synthesized by the second coupler into a optical pulse pair signal. The length of the first fiber is greater than the one of the second fiber.

In some embodiments, the fiber grating sensor array comprises a plurality of fiber Bragg gratings and a plurality of induction coils, wherein the plurality of fiber Bragg gratings are arranged in sequence. Each two adjacent gratings form a Fabry-Perot cavity. The multiple induction coils are correspondingly and separately embedded into the Fabry-Perot cavities.

In some embodiments, a modulation of the fiber grating sensor array is as follows. The external sensing signal acts on the Fabry-Perot cavity through the induction coil and causes the change of a cavity length of the Fabry-Perot cavity. The change of the cavity length will further cause the phase change of the input optical pulse pair signal. For any one of the Fabry-Perot cavities, a previous pulse of the optical pulse pair, with phase change information, reflected by the back grating in the cavity is overlapped with a late pulse of the optical pulse pair, without phase change information, reflected by the front grating in the cavity, and therefore forming an interference optical pulse signal having external sensing information by interfering with each other.

In some embodiments, the time delay corresponding to the arm length difference between the first fiber and the second fiber in the delay fiber pair is half of the time delay corresponding to the cavity length of the Fabry-Perot cavity.

In some embodiments, the repetition period of the pulsed optic signal output by the acousto-optic modulator is 2(M+1) times the time delay corresponding to the arm length difference between the first fiber and the second fiber in the delay fiber pair, wherein M is the number of gratings in the fiber grating sensor array.

In some embodiments, a pulse width of the interference optical pulse signal is greater than or equal to $1/f_1$.

In some embodiments, the data acquisition card obtains the corresponding digital signal after synchronous sampling, and then demodulates the digital signal according to the time sequence by the feature sampling demodulation algorithm to obtain the external sensing signal of each position. The specific process of the feature sampling demodulation algorithm is as follows: first, the electrical signal output by the photodetector is synchronized to determine the position of the first sampling point $P_0$. In each frequency modulation period $1/f_1$, twelve data points ($P_0$, . . . , $P_{11}$) are sampled from the electric signal. The electric signal is expanded into a superposition of the DC term and the even and odd signals (i.e. even signal $I_1$ and odd signal $I_2$). The maximum and minimum values of the even signal $I_1$ and the odd signal $I_2$ are obtained through their internal time variables at $1/12f_1$ intervals. In the even signal $I_1$, values at each time interval of $1/2f_1$ remain the same. In the odd signal $I_2$, values at each time interval of $1/2f_1$ are opposite. The peak-to-peak value of the even signal $I_1$ is obtained by adding two sets of data points ($P_0$, $P_6$) and ($P_3$, $P_9$) with a time interval of $1/2f_1$ to the electrical signal I. Namely, the subtraction of the sum of $P_0$ and $P_6$ to the sum of $P_3+P_9$ can offset the influence of the DC term A in the electrical signal. The peak-to-peak value of the odd signal $I_2$ is obtained by subtracting two sets of data points ($P_1$, $P_7$) and ($P_5$, $P_{11}$) with a time interval of $1/2f_1$ to the electrical signal. Namely, the sum of the difference of $P_7-P_1$ and the difference of $P_{11}-P_5$ can offset the influence of the DC term A. The peak-to-peak value of the even signal $I_1$ and the peak-to-peak value of the odd signal $I_2$ are orthogonal to each other. After the two sets of orthogonal signals are divided, the arctangent operation is performed to obtain the external sensing signal to be demodulated.

The present disclosure provides at least the following technical benefits.

(1) The present disclosure uses an acousto-optic modulator to shift the frequency of the light source to form pulsed light required for array demodulation, which reduces the chirp effect caused by the direct modulation of the light source.

(2) The present disclosure uses delay fiber pair in conjunction with the fiber gratings to make the reflected optical pulse of the front and back gratings overlapped in the time domain, thereby realizing multi-point array pulse interference demodulation. This method eliminates the non-synchronous pulse interferes with the demodulation result and the demodulation structure is simple and easy to implement.

(3) The device of the present disclosure also combines the characteristics of the interfering optical pulse signal to use a feature point sampling algorithm for demodulation. The demodulation algorithm is simple, and the demodulation accuracy is great.

DETAILED DESCRIPTION OF THE DISCLOSURE

The present disclosure will be specified below with reference to the accompanying drawings and specific embodiments.

Figure 1:
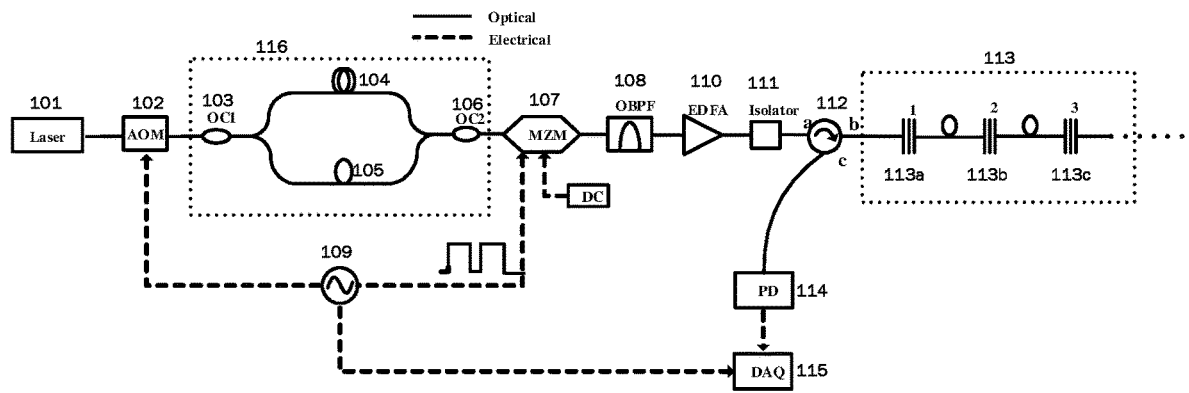
FIG. 1 is a schematic diagram of the frequency modulation demodulator according to the present disclosure.

As shown in FIG. 1, the frequency modulation demodulator based on fiber grating sensor array comprises a laser 101, an acousto-optic modulator (AOM) 102, a delay fiber pair 116, a Mach-Zehnder modulator (MZM) 107, an optical bandpass filter (OBPF) 108, an optical amplifier (EDFA) 110, an optical isolator 111, a circulator 112, a fiber grating sensor array 113, a photodetector (PD) 114, a data acquisition card (DAQ) 115, and a radio frequency signal source 109. The laser 101, the acousto-optic modulator 102, the delay fiber pair 116, the Mach-Zehnder modulator 107, the optical bandpass filter 108, the optical amplifier 110, the optical isolator 111, the circulator 112, the fiber grating sensor array 113, the photodetector 114, the data acquisition card 115, and the radio frequency signal source 109 are connected together in sequence.

The narrow linewidth light source 101 generates a continuous narrow linewidth optical signal and transmits the optical signal to the acousto-optic modulator 102. The acousto-optic modulator 102 is not only a frequency shifter that shifts the frequency of the light source by f ($f=2\pi/\omega_1$), but also a pulse modulator. The continuous light is modulated into pulsed light by the pulse modulator. The light pulse modulated by the acousto-optic modulator 102 can be expressed as:

$$E_0 = A e^{j(\omega_0+\omega_1)t} \quad NT_1 < t < T_2+(N+1)T_1, \text{ N is integer.}$$

Where, A is the amplitude of the light wave; $\omega_0$ is the emission angular frequency of the light source 101; $\omega_1$ is the frequency shift angular frequency of the acousto-optic modulator 102; $T_1$ is the light pulse repetition period, and $T_2$ is the pulse width of the light pulse. The present disclosure uses an acousto-optic modulator to form an optical pulse signal. Compared with the traditional direct light source modulation, the present disclosure can reduce the influence of the chirp effect and improve the demodulation accuracy.

The output light pulse of the acousto-optic modulator 102 enters the delay fiber pair 116. The delay fiber pair 116 comprises a first coupler (OC1) 103, a first fiber 104, a second fiber 105, and a second coupler (OC2) 106. The light pulse is divided into two light pulses for entering two paths after the light pulse entering the first coupler 103, one of the two light pulses enters the first fiber 104 with a length of $L_1$, the other enters the second fiber 105 with a length of $L_2$. These two light pulses with different delays are then form a pulse pair at the output end of the second coupler 106. The two light pulses before and after the pulse pair can be expressed as:

$$E_1 = A e^{j(\omega_0+\omega_1)t} \quad E_2 = A e^{j(\omega_0+\omega_1)(t+\tau)}$$

Where, $\tau$ is the delay difference of the delay fiber pair 116, and $T_2 < \tau < T_1$.

The optical pulse pair output from the delay fiber pair 116 is intensity-modulated after entering the Mach-Zehnder modulator 107, and then is filtered by the optical bandpass filter 108 to retain its first-order side-band. The two light pulses before and after the pulse pair output after light intensity modulation and band pass filtering can be expressed as:

$$E_3 = A e^{j[(\omega_0+\omega_1+\omega_c)t+\beta\cos(\omega_2 t)]} \quad E_4 = A e^{j[(\omega_0+\omega_1)(t+\tau)+\omega_c t+\beta\cos(\omega_2 t)]}$$

Where, $\omega_c$ is the central angular frequency of the unmodulated radio frequency signal of the Mach-Zehnder modulator 107; $\beta$ is the frequency modulation index of the Mach-Zehnder modulator 107; and $\omega_2$ is the frequency modulation angular frequency ($\omega_2 = 2\pi f_1$) of the Mach-Zehnder modulator 107. In order to strictly ensure the synchronization relationship between the demodulated signals, the signals driving the acousto-optic modulator 102 and the Mach-Zehnder modulator 107 can come from the same radio frequency signal source 109. And in order to ensure that the polarization state remains unchanged during the light propagation process, the components before the Mach-Zehnder modulator all are polarization maintaining devices.

the single-sideband FM (Frequency Modulation) pulse pair output by the bandpass filter 108 enters the port a of the circulator 112 after passing through the optical amplifier 110 and the optical isolator 111, and is output to the fiber grating sensor array 113 from the port b of the circulator 112.

The fiber grating sensor array 113 comprises a plurality of broadband fiber Bragg gratings (FBG) 113a, 113b, 1113c, . . . . The center wavelength of each grating is the same, preventing the light intensity returning from the FBG and the visibility of the interference fringe from weakening. Every two adjacent gratings in the array forms a fiber Bragg grating-Fabry-Perot (FBG-FP) cavity. The external disturbance signal acts on the FP cavity through the induction coil, and the optical phase changes due to the change of cavity length. The optical pulse pair modulates the external disturbance signal on the fiber grating sensor array 113, and then returns to the port b of the circulator 112 and then is output from the port c of the circulator 112. The output signal at last enters the photodetector 114 and is converted into an electrical signal. The electrical signal is digitally sampled by the digital sampling system 115. At last, the disturbance of each position is extracted and demodulated separately in time division order.

Figure 2:
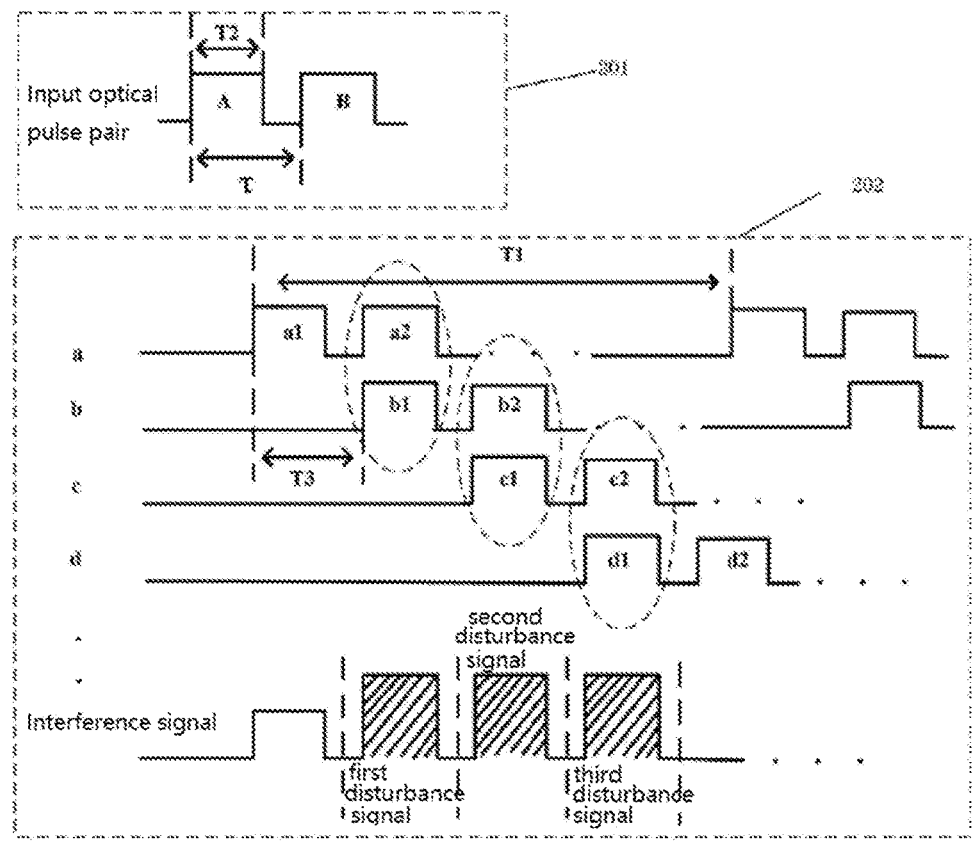
FIG. 2 is a diagram of the time sequence of the interfering optical pulse of the fiber grating sensor array according to the present disclosure.

FIG. 2 is a sequence diagram of a series of interfering light pulses returned by the optical pulse pair through the fiber grating sensor array 113. In combination with the demodulator of FIG. 1, in the timing waveform 201, pulse A is the front pulse waveform after the light pulse pair, and pulse B is the back pulse waveform after the light pulse pair. In the timing waveform 202, pulse a1 is the waveform of the pulse A being reflected by the grating 113a, pulse a2 is the waveform of the pulse B being reflected by the grating 113a. Pulse b1 is the waveform of the pulse A being reflected by the grating 113b, and pulse b2 is the waveform of the pulse B being reflected by the grating 113b; and so on. Among them, $T_1$ is the repetition period of the optical pulse, $T_2$ is the pulse width of the optical pulse, $\tau$ is the delay difference of the delay fiber pair 116, and $T_3$ is the delay difference caused by the reflection of two adjacent gratings (i.e. twice delay difference corresponding to the FP cavity length). When $\tau$ is equal to $T_3$ (i.e. the cavity length between the two adjacent gratings in the fiber grating sensor array 113 is half the arm length difference between the fiber delay pair 116), the late pulse a2 reflected from the front grating 113a is overlapped with the previous pulse b1 reflected from the back grating 113b in overlapped in the time domain to form interference, and thereby achieving multi-point array interference demodulation. In the same way, pulse b2 is overlapped with pulse c1; pulse c2 is overlapped with pulse d1, and so on. At the same time, in order to avoid the interference signal obtained from the multiple FBG-FP cavities within the grating array from be interfered by multiple grating reflections, the optical pulse repetition period $T_1$ should be set to be long enough, and be an integer multiples of the time delay difference $T_3$ caused by reflection of the two adjacent gratings. Specifically, as the formation of interference signals shown in FIG. 2, if the fiber grating array comprises M gratings and forms M−1 FBG-FP cavities, in order to ensure that the last reflected pulse of the first pulse pair does not overlap with the first reflected pulse of the second pulse pair, it should be set $T_1 > (M+1)T_3$. At the same time, in order to avoid the multiple grating reflection signals reserved for the previous pulse from being disturbed by the next pulse, it is preferably to set $T_1 > 2(M+1)T_3$.

Where, before the interference, the optical pulse b1 can be expressed as:

$$E_5 = A(1-R)\sqrt{R} e^{j\{(\omega_0+\omega_1+\omega_c)(t+\tau)+\beta\cos[\omega_2(t+\tau)]+p(t)\}}$$

The optical pulse a2 can be expressed as:

$$E_6 = A\sqrt{R} e^{j[(\omega_0+\omega_1)(t+\tau)+\omega_c t+\beta\cos(\omega_2 t)]}$$

Where, R is the grating reflectivity; $\tau$ is not only the delay difference of the delay fiber pair 116 but also the delay difference corresponding to twice the FP cavity length; p(t) is the phase change caused by the external disturbance signal acting on the FP cavity.

The electrical signal converted by the photodetector 114 from the two optical pulse b1 and a2, which are overlapped in the time domain and being interfered, can be expressed as:

$$I_1 = (E_5 + E_6)(E_5 + E_6)^*$$
$$= A^2\{(1-R)^2 R + R +$$
$$2(1-R)R\cos[2\beta\sin(\frac{\omega_2\tau}{2})\sin(\omega_2 t + \frac{\omega_2\tau}{2}) + p(t) + \omega_c\tau]\}$$

The output electrical signal can be further simplified as:

$$I = A + B\cos[M\sin(\omega_{FM}t + \varphi_0) + p(t) + \varphi_1(t)]$$

As shown in the above expression, the interference signal sampled by the data acquisition card 115 comprises direct component and cosine wave signal. The sample result may be demodulated by feature sampling method.

Figure 3:
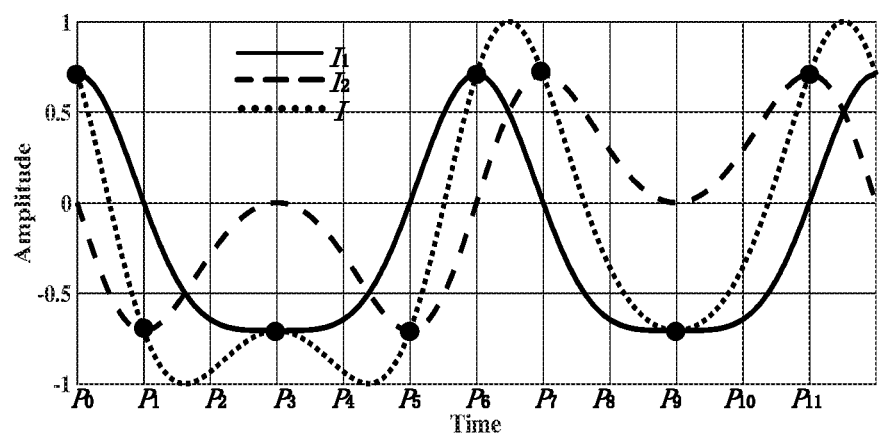
FIG. 3 is a schematic diagram showing the twelve data points sampled on one single frequency modulation cycle.

FIG. 3 is a schematic diagram of the digital sampling system 115 sampling twelve data points in a frequency modulation cycle of the interferometric electrical pulse signal output by the photodetector 114. Every $\pi/6$ rad in a frequency modulation cycle, one data point is sampled. From this we can obtain: $I_1(t) = I_1(t+6)$, $I_2(t) = I_2(t+6)$. Accordingly, the peak-to-peak value of the signal $I_1$ can be measured by adding two data points, e.g. $P_6$ and $P_0$, on the signal I at every $\pi$ rad interval. The peak-to-peak value of the signal $I_2$ can be measured by subtracting two data points, e.g. $P_7$ and $P_1$, on the signal I at every $\pi$ rad interval.

Figure 4:
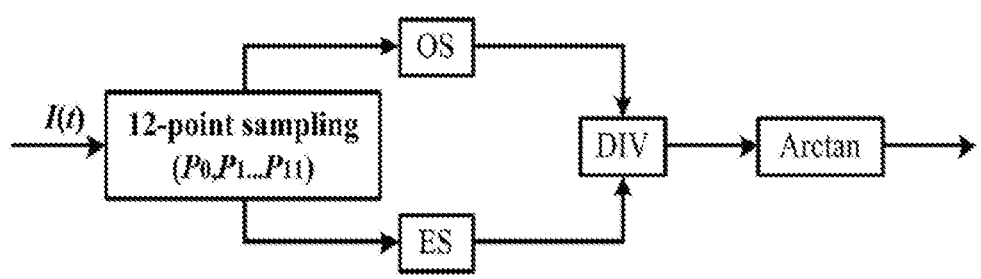
FIG. 4 is a schematic diagram showing the twelve-point sampling quadrature demodulation algorithm.

FIG. 4 shows a twelve-point sampling quadrature demodulation algorithm. Under the condition of data sampling, the present disclosure proposes a method for quadrature demodulation of external disturbance signals that samples twelve data points per frequency modulation period, and 8 points are taken and paired to obtain the following expression:

$$OS = (P_7 - P_1) + (P_{11} - P_5) = 4B\sin[p(t)]$$

$$ES = (P_0 + P_6) - (P_3 + P_9) = 4B\cos[p(t)]$$

It can be seen that both the differences of $P_7 - P_1$ and $P_{11} - P_5$ offset the influence of the DC term A in the interference signal I, respectively; the subtraction of $(P_0 + P_6)$ and $(P_3 + P_9)$ also offset the DC term in the influence of the interference signal I. The external disturbance signal can be demodulated by performing arctangent operation on two orthogonal signals:

$$p(t) = \arctan(OS/ES)$$

The above description of the embodiments is to facilitate those of ordinary skill in the art to understand and apply the present disclosure. It is obvious that those skilled in the art can easily make various modifications to the above-mentioned embodiments, and apply the general principles described here to other embodiments without creative efforts. Therefore, the present disclosure is not limited to the above-mentioned embodiments. According to the disclosure of the present disclosure, the improvements and modifications made to the present disclosure by those skilled in the art are within the scope of the present disclosure.

What is claimed is:

1. A frequency modulation demodulator based on fiber grating sensor array, comprising:
   a laser,
   radio frequency signal source,
   acousto-optic modulator,
   a delay fiber pair,
   a Mach-Zehnder modulator,
   an optical filter,
   an optical amplifier,
   an optical isolator,
   a circulator,
   a fiber grating sensor array, and
   a photodetector and data acquisition card having an internal digital processing unit;
   wherein the laser is configured for emitting continuous narrow linewidth optical signals;
   the radio frequency signal source is configured for generating a frequency shift signal, an intensity modulation signal with a frequency $f_1$, and a clock synchronization signal;
   the acousto-optic modulator is configured for simultaneously performing frequency shift and intensity modulation on the optical signal emitted by the laser according to the frequency shift signal, thereby outputting a pulsed optical signal;
   the delay fiber pair is configured for dividing the pulsed optical signal output by the acousto-optic modulator into two paths, and the two paths of optical signals are combined into an optical pulse pair signal after different delays;
   the Mach-Zehnder modulator is configured for modulating intensity of the optical pulse pair signal generated by the delay fiber pair and outputting a modulated optical pulse pair signal according to the intensity modulation signal;
   the optical filter is configured for filtering the modulated optical pulse pair signal output by the Mach-Zehnder modulator and outputting a filtered optical pulse pair signal, so as to filter out a sideband on one side of the optical pulse pair signal; the filtered optical pulse pair signal output by the optical filter enters the fiber grating sensor array after passing through the optical amplifier, the optical isolator, and the circulator;
   the fiber grating sensor array is configured for detecting external sensing signals at different positions; the external sensing signals will cause the phase change of the filtered optical pulse pair output by the optical filter, and feedback a series of interference optical pulse signal having external sensing information; these external sensing signals then are outputted by the circulator to the photodetector;
   the photodetector is configured to convert the interference optical pulse signal into electrical signals; and
   the data acquisition card is configured for synchronously sampling the electrical signals based on the clock synchronization signal to obtain digital signals, and then demodulating the digital signals by the internal digital signal processing unit to obtain external sensing signals.

2. The frequency modulation demodulator according to claim 1, wherein a narrow linewidth DFB (Distributed Feedback Laser) light source is used as the laser; the radio frequency signal source has an analog signal source and internally integrates a frequency modulation module and a synchronization module.

3. The frequency modulation demodulator according to claim 1, wherein the laser, the acousto-optic modulator, and the delay fiber pair are polarization-maintaining devices.

4. The frequency modulation demodulator according to claim 1, wherein the delay fiber pair comprises a first coupler, a second coupler, a first fiber and a second fiber; wherein the first coupler is configured for dividing the pulsed optic signal output by the acousto-optic modulator into two pulsed optic signals; the two paths of the two optical signals individually passes through the first fiber and the second fiber, and are synthesized by the second coupler into the optical pulse pair signal; the length of the first fiber is greater than the length of the second fiber.

5. The frequency modulation demodulator according to claim 4, the fiber grating sensor array comprises a plurality of fiber Bragg gratings and a plurality of induction coils, wherein the plurality of fiber Bragg gratings are arranged in sequence; each two adjacent gratings form a Fabry-Perot cavity; the plurality of induction coils are correspondingly and separately embedded into the Fabry-Perot cavities.

6. The frequency modulation demodulator according to claim 5, wherein a first time delay corresponding to an arm length difference between the first fiber and the second fiber in the delay fiber pair is half of a second time delay corresponding to a cavity length of the Fabry-Perot cavity.

7. The frequency modulation demodulator according to claim 5, wherein a repetition period of the pulsed optic signal output by the acousto-optic modulator is 2(M+1) times the first time delay corresponding to the arm length difference between the first fiber and the second fiber in the delay fiber pair, wherein M is the number of gratings in the fiber grating sensor array.

8. The frequency modulation demodulator according to claim 1, wherein a pulse width of the interference optical pulse signal is greater than or equal to $1/f_1$.

\* \* \* \* \*